(12) United States Patent
Ramoutar et al.

(10) Patent No.: US 10,480,608 B2
(45) Date of Patent: Nov. 19, 2019

(54) MACHINE VIBRATION ISOLATION

(71) Applicant: GLEASON METROLOGY SYSTEMS CORPORATION, Dayton, OH (US)

(72) Inventors: Nigel Ramoutar, Rochester, NY (US); Edward J. Damron, Waynesville, OH (US); Jason Kauffman, Dayton, OH (US); Kishore N. Lankalapalli, Sanford, FL (US)

(73) Assignee: GLEASON METROLOGY SYSTEMS CORPORATION, Dayton, OH (US)

( * ) Notice: Subject to any disclaimer, the term of this patent is extended or adjusted under 35 U.S.C. 154(b) by 23 days.

(21) Appl. No.: 15/524,443

(22) PCT Filed: Nov. 23, 2015

(86) PCT No.: PCT/US2015/062072
§ 371 (c)(1),
(2) Date: May 4, 2017

(87) PCT Pub. No.: WO2016/085834
PCT Pub. Date: Jun. 2, 2016

(65) Prior Publication Data
US 2018/0058538 A1 Mar. 1, 2018

Related U.S. Application Data

(60) Provisional application No. 62/083,943, filed on Nov. 25, 2014.

(51) Int. Cl.
*F16M 5/00* (2006.01)
*F16F 15/023* (2006.01)
(Continued)

(52) U.S. Cl.
CPC ............ *F16F 15/0232* (2013.01); *F16F 9/02* (2013.01); *F16F 9/50* (2013.01); *F16F 7/00* (2013.01);
(Continued)

(58) Field of Classification Search
CPC ... F16M 5/00; F16M 2200/08; F16F 15/0232; F16F 15/022; F16F 15/04; F16F 9/02; F16F 9/50; F16F 7/00; Y10T 74/2131
See application file for complete search history.

(56) References Cited

U.S. PATENT DOCUMENTS 3,429,533 A * 2/1969 Harkness ................ F16F 15/08
248/637
3,917,201 A 11/1975 Roll
(Continued)

FOREIGN PATENT DOCUMENTS

EP 0055824 A1 7/1982
EP 2671791 A1 12/2013
(Continued)

OTHER PUBLICATIONS

International Search Report and Written Opinion for PCT/US2015/062072, ISA/EPO, dated Apr. 22, 2016, 12 pgs.
(Continued)

*Primary Examiner* — Tan Le
(74) *Attorney, Agent, or Firm* — Robert L. McDowell

(57) ABSTRACT

A machine base (4) comprising a lower base portion (8) and an upper base portion (10) with the upper base portion including a downwardly projecting portion (14) extending to, into or through the lower base portion with no contact between the upper and lower base portions. The machine base further includes at least two vibration and/or shock isolation sub-systems (22, 24).

23 Claims, 5 Drawing Sheets

(51) Int. Cl.
*F16F 9/50* (2006.01)
*F16F 9/02* (2006.01)
*F16F 15/02* (2006.01)
*F16F 7/00* (2006.01)
*F16F 15/04* (2006.01)

(52) U.S. Cl.
CPC ............ *F16F 15/022* (2013.01); *F16F 15/04* (2013.01); *F16M 5/00* (2013.01); *F16M 2200/08* (2013.01)

(56) References Cited

U.S. PATENT DOCUMENTS

| | | | | |
|---|---|---|---|---|
| 4,515,234 | A | * | 5/1985 | Loy .................... B62D 33/0604 180/89.12 |
| 5,042,162 | A | * | 8/1991 | Helms ................... F16F 7/1005 248/559 |
| 5,573,220 | A | * | 11/1996 | Whittaker ............ D03D 49/025 248/615 |
| 5,701,969 | A | * | 12/1997 | Stephens .............. B60K 5/1216 180/299 |
| 2006/0002228 | A1 | | 1/2006 | Schulz et al. |
| 2010/0050832 | A1 | | 3/2010 | Kim et al. |
| 2015/0144763 | A1 | * | 5/2015 | Aeffner .................... F16M 5/00 248/562 |

FOREIGN PATENT DOCUMENTS

| | | |
|---|---|---|
| FR | 2536485 A1 | 5/1984 |
| JP | 04-034245 A | 2/1992 |
| JP | 07-310779 A | 11/1995 |
| JP | 09-131633 A | 5/1997 |
| JP | 2010-058263 A | 3/2010 |

OTHER PUBLICATIONS

EPO Office Action for EP 15820917.1 dated Dec. 10, 2018.
Fabreeka Vibration & Shock Control, Fabcel Pads for Reduction of Low Frequency Vibration, Fabreeka International Inc., May 2011, 12 pgs.
English translation of JPO Official Action for Appln. No. 2017-528183, dated Apr. 23, 2019.

* cited by examiner

MACHINE VIBRATION ISOLATION

FIELD OF THE INVENTION

The present invention relates to machines and machine tools and in particular to a machine or machine tool base having a vibration isolation system.

BACKGROUND OF THE INVENTION

In most industrial processes, vibration is an unwanted element that can degrade the process, the machine and/or the workpiece. For example, in the gear industry, a workpiece may be inspected and/or measured to an accuracy of millionths of a meter (μm) or a workpiece may be finished, such as by grinding, with acceptable tolerances also measured in millionths of a meter. Vibration can affect the machines and/or processes whereby such desired accuracies cannot be achieved.

Sources of vibration include individual elements of a machine, the entire machine vibrating and/or rocking, and vibrations introduced from external sources which usually enter through the machine base. The ground (e.g. floor) on which a machine rests may be a source of significant vibration. Such vibration may be naturally occurring or may originate from other external factors. For example, in a factory setting, shock and/or vibrations from nearby machines and the processes they perform may affect the performance of a metrology machine which can be very susceptible to vibration. In many instances, metrology machines are confined to laboratory environments with special floor construction so as to minimize external vibrations.

However, there is a need to bring certain vibration-sensitive machines, such as metrology machines, to the factory floor. Having a metrology machine in close proximity to a machine or group of machines that produce gears, for example, enables a much faster inspection of workpieces compared to the time and effort expended to transport a gear to and from a laboratory for inspection. The entire manufacturing process can be enhanced if a metrology machine can be placed with other machines in a factory setting while continuing to deliver accurate inspection and/or measurement results. To accomplish this, the metrology machine (or any other vibration sensitive machine or machine tool) must be isolated from the ill-effects of vibration.

SUMMARY OF THE INVENTION

The invention is directed to a machine base comprising a lower base portion and an upper base portion with the upper base portion including a downwardly projecting portion extending to, into or through the lower base portion with no contact between the upper and lower base portions. The machine base further includes at least two vibration and/or shock isolation sub-systems.

DETAILED DESCRIPTION OF THE PREFERRED EMBODIMENT

Figure 1:
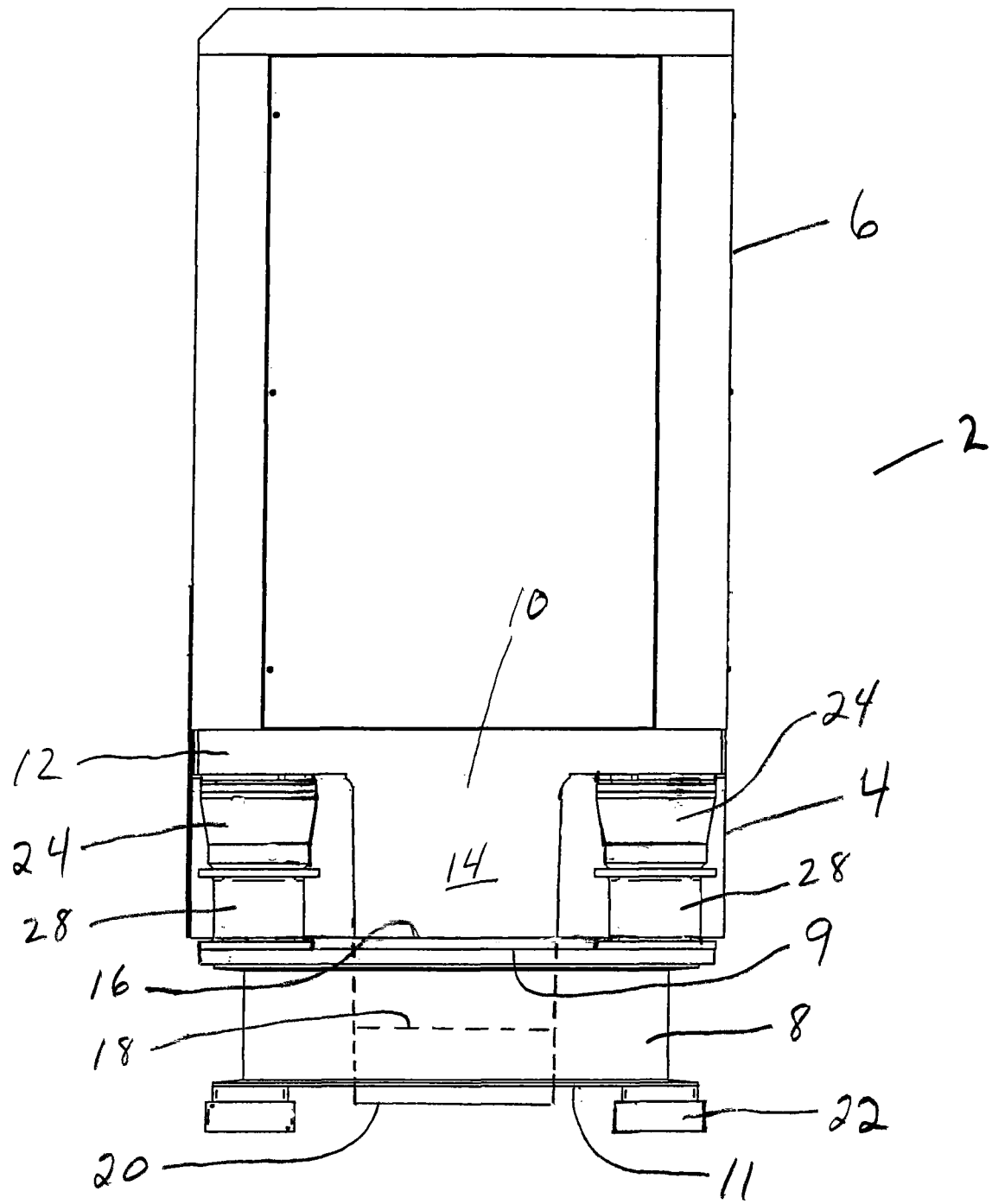
FIG. 1 illustrates a side view of a machine including a two-piece base with air cylinder vibration isolators.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

Details of the invention will now be discussed with reference to the accompanying drawings which illustrate the invention by way of example only. In the drawings, similar features or components will be referred to by like reference numbers. The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the invention, these references are made relative to the drawings as normally viewed.

It should be understood that the particular function or functional elements of a machine or machine tool is not the focus of the invention which instead is concerned with a machine base and the ability of the base to isolate and/or dampen shock and/or vibrations. It should also be understood that in the context of this discussion, the term "machine" is deemed to include machines that do not remove metal or other materials (e.g. machines for measuring, inspecting, testing, etc.) as well as "machine tools" which function to remove metal or other materials in a variety of ways (e.g. grinding, honing, cutting, lapping, etc.). Furthermore, the invention is not limited to any particular type of workpiece and while the discussion may relate to machines, machine tools and workpieces directed to processing gears and other toothed articles as well as the tools for their production, the invention is not limited thereto.

FIG. 1 illustrates a machine 2, such as an inspection and measurement machine for gears, for example. Machine 2 comprises a generally square or rectangular base portion 4 and an operational portion comprising the functional elements of the machine which is shown generally by a machine enclosure 6. Base 4 comprises a lower base portion 8 preferably made of steel, but alternatively may be produced from materials including granite, mineral casting, polymer casting, cast steel and cast aluminum alloy. Base 4 further comprises an upper base portion 10 preferably made of cast iron, but alternatively may be produced from materials including granite, mineral casting, polymer casting, cast steel, cast aluminum alloy and a welded steel structure. The upper base portion 10 preferably has a cross-sectional shape in the general form of the letter "T" and comprises a horizontally extending portion 12 and a downwardly projecting portion 14.

The downwardly projecting portion 14 may extend to a position 16 above or to the top end 9 of lower base portion 8. Alternatively, downwardly projecting portion 14 may extend into an appropriate recess, opening to top end 9, in the lower base portion 8 to a location 18 (e.g. half-way through the height of lower base portion 8) or to some other location between ends 9 and 11, or, downwardly projecting portion 14 may extend entirely thorough base portion 8, via an opening 13 (see FIG. 3, 4 or 5) in the base portion to a location 20 at or below the bottom end 11 of lower base portion 8. It should be noted that regardless of the extent of the downwardly projecting portion 14, there is no direct contact between lower base portion 8 and upper base portion 10. Lengthening the downwardly projecting portion 14 so that it extends further into or through the lower base portion 8 has the advantage of lowering the center of gravity of the entire machine which enhances machine stability particularly reducing machine rocking and improving lateral stability.

The inventive machine base 4 comprises a vibration and shock isolation system having at least two vibration and/or shock isolating sub-systems wherein the sub-systems may be one or more of, for example, air systems, mechanical systems, negative stiffness systems, hydraulic systems and pneumatic systems. A first or lower isolation sub-system is located between the lower base portion 8 and the "ground" which is usually, for example, a floor of a facility such as factory or a laboratory. The first vibration system preferably includes a plurality (e.g. three or more are preferred) of leveling pads 22, preferably made of steel and preferably including at least one layer of a polymer composite material such as, for example, a steel and anti-skid pad available from Bilz Technologies. Alternatively, any other material and/or mechanism exhibiting a controlled amount of compliance and dampening may be utilized.

A second or upper isolation sub-system is included in the inventive machine base 4 and is located between the lower base portion 8 and the upper base portion 10. In one embodiment, machine base 4 comprises a plurality (three or more are preferred) of air cylinders 24 (two are shown in FIG. 1) located on pedestals 28. Alternatively, pedestals 28 may be part of the lower base 8. The air cylinders 24 may be of the type known as "Membrane Air Spring with Mechanical Level Control System (Trade Name "BiAir")" which is available from Bilz Technologies. The levelling of the air cylinders may be may be individually controlled or two or more of the air cylinders may be controlled by one levelling valve (not shown).

Figure 2:
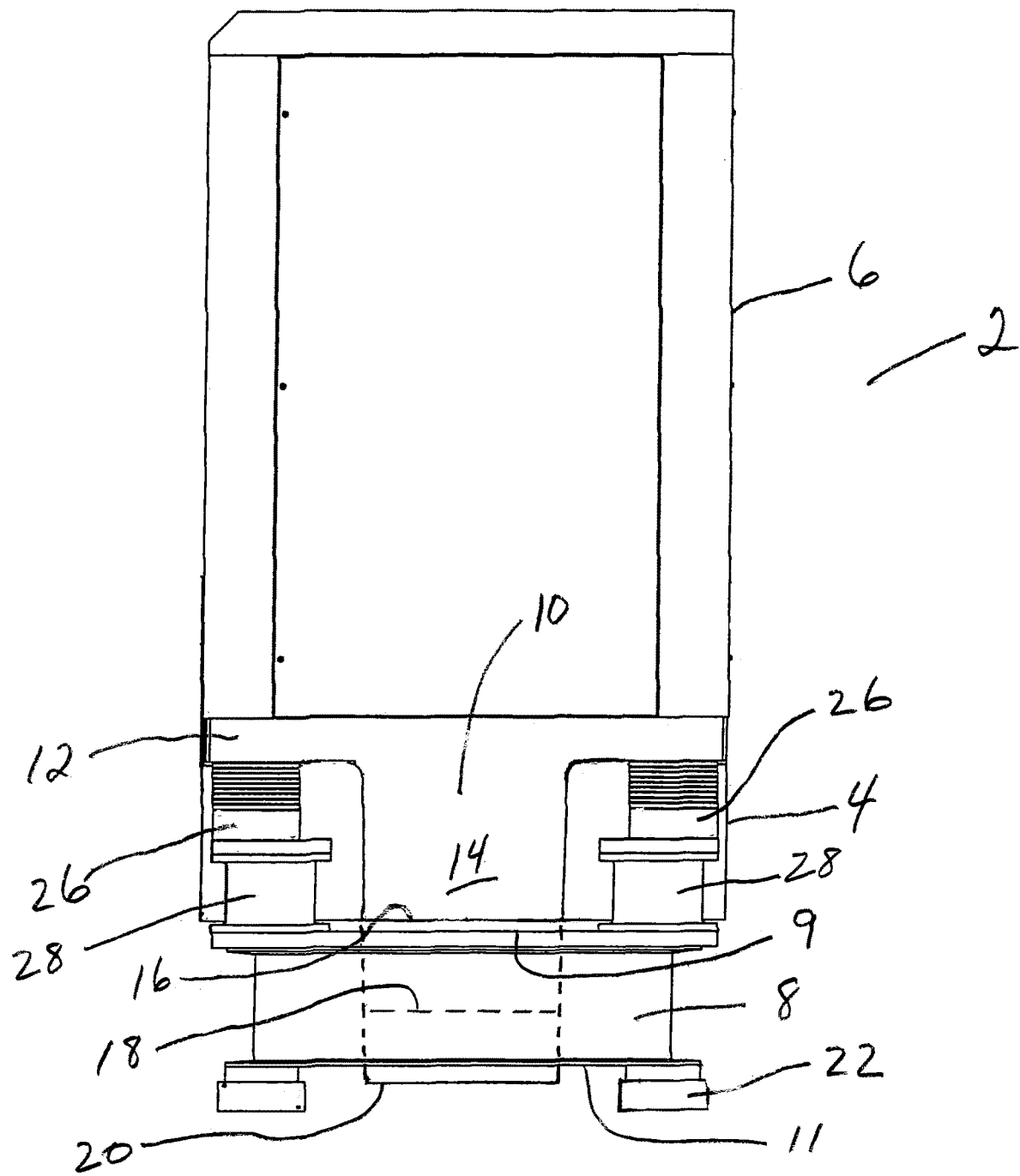
FIG. 2 illustrates a side view of a machine including a two-piece base with stacked vibration isolation pads.

FIG. 2 shows another embodiment of a second isolation sub-system wherein machine base 4 comprises a plurality (three or more are preferred) of isolation pad stacks 26 (two are shown in FIG. 2) located on pedestals 28. The isolation pad stacks may be of the type known as "Precision Leveling Wedge with Isolation Material and Anti-Skid Pad Stack" which is available from Bilz Technologies. Another commercially available vibration isolation pad is Fabcel Nitrile Pad manufactured by Fabreeka.

The first and second shock and vibration isolation sub-systems act together to give an overall large de-amplification of a broad range of vibration. Simultaneously, the overall system allows for large shock displacement isolation. The first and second isolation sub-systems should be selected so that together they function to isolate low and high frequencies, shock and harmonic vibrations, and/or modal parameters and lateral-to-vertical cross-compliances.

Figure 3:
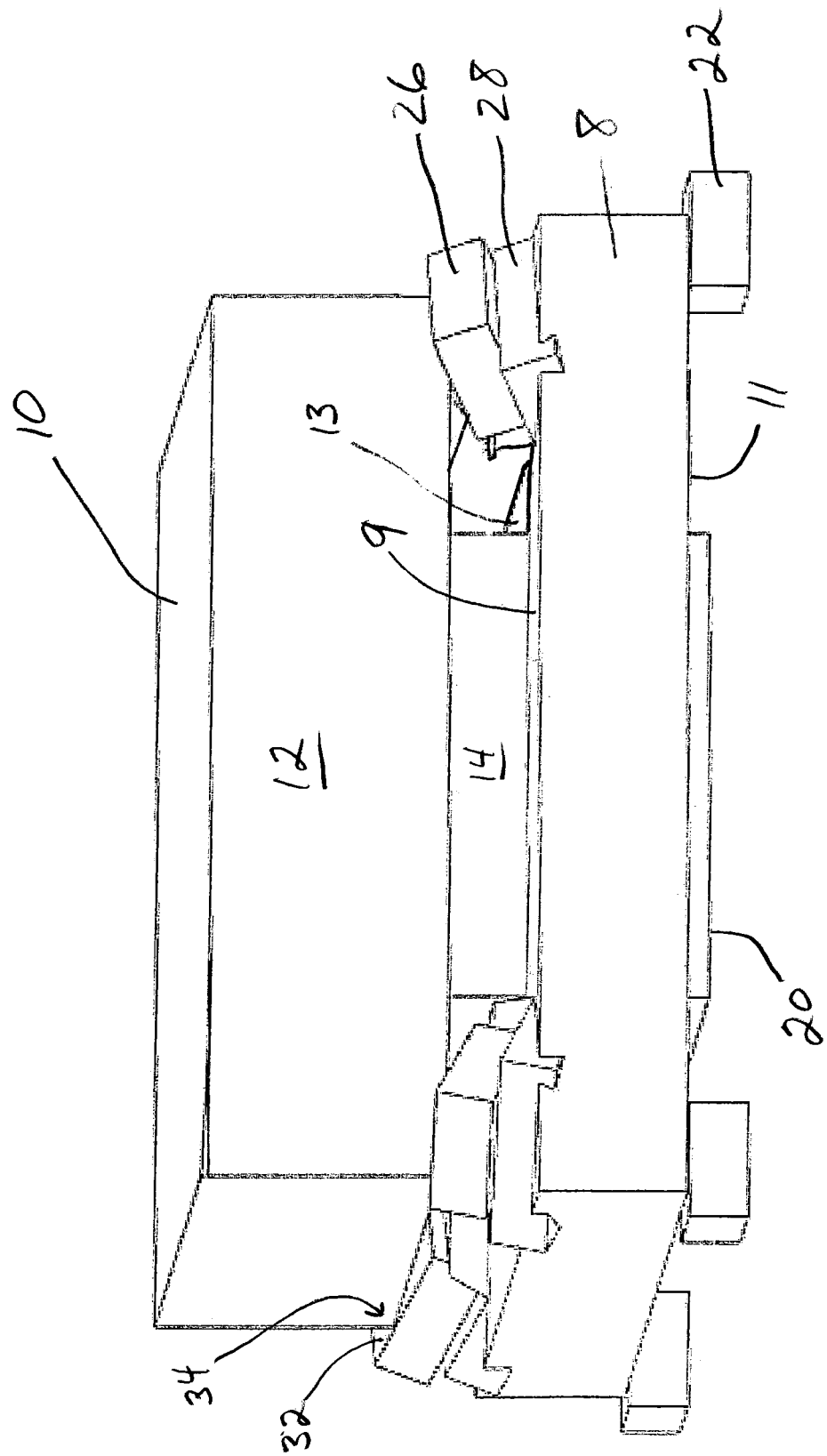
FIG. 3 shows a two-piece base wherein the vibration isolators are oriented at an angle other than vertical.
Figure 4:
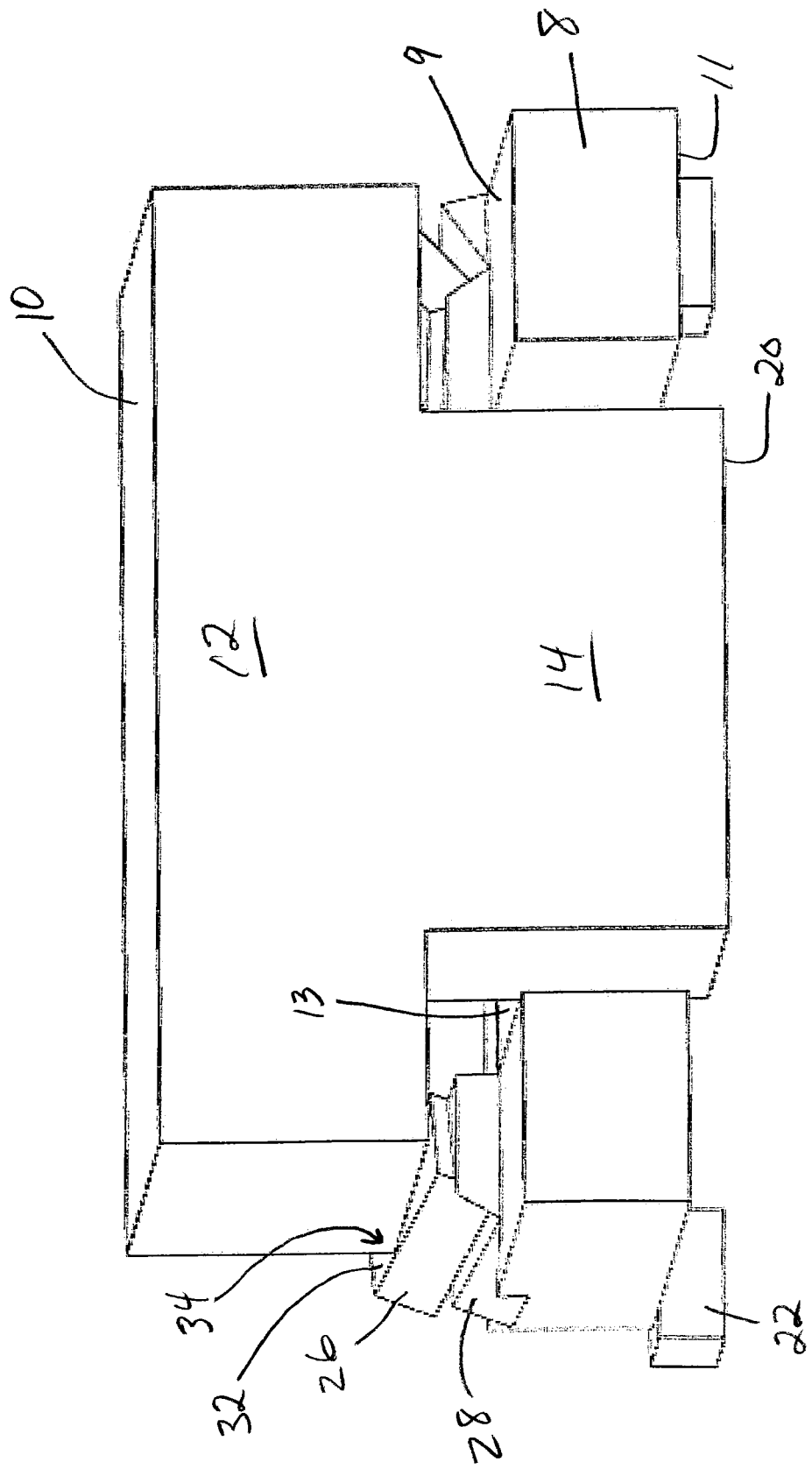
FIG. 4 is a cross-sectional view of the two-piece base of FIG. 3.
Figure 5:
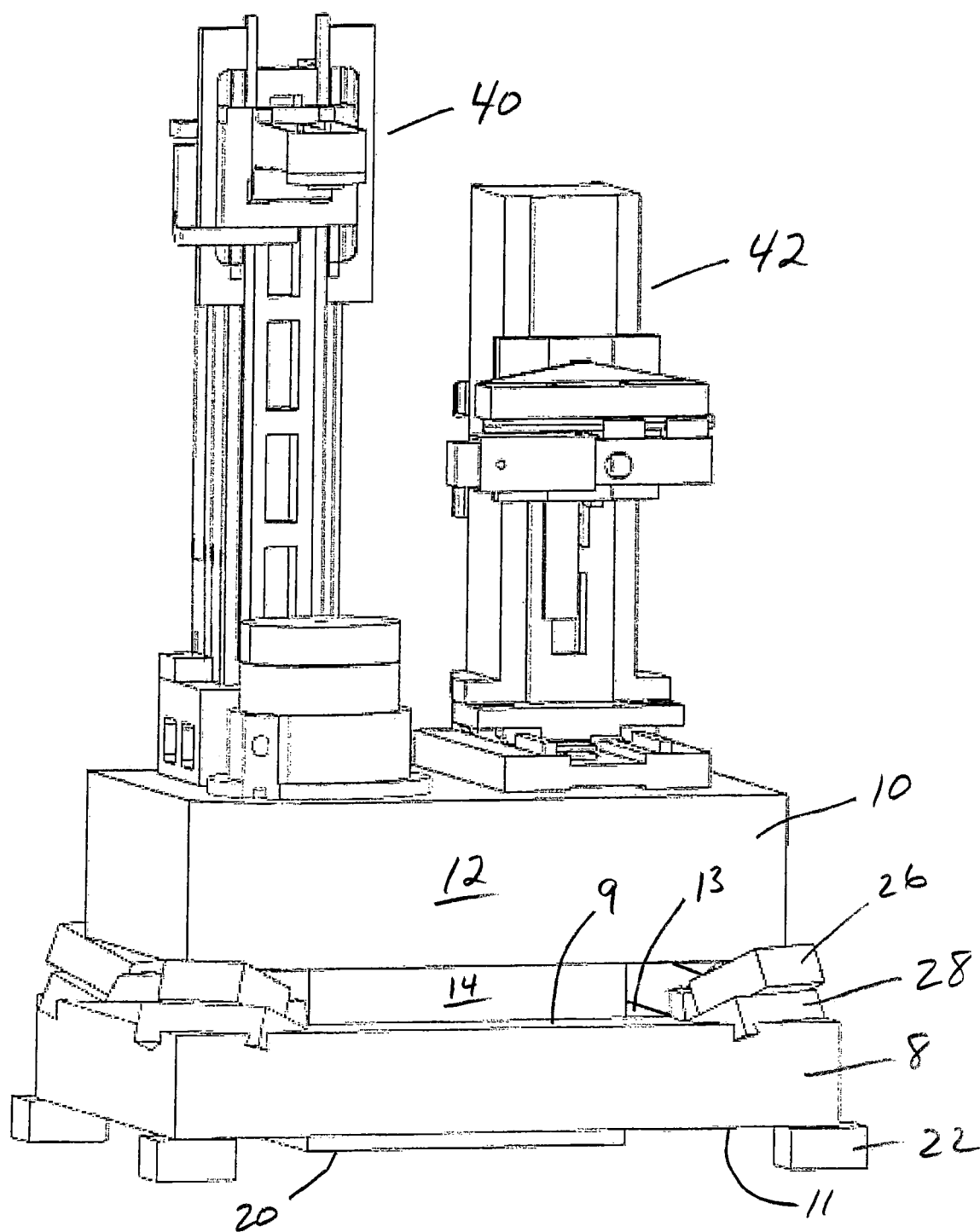
FIG. 5 illustrates the two-piece base of FIG. 3 including two machine columns positioned thereon.

FIGS. 3 and 4 show the invention wherein a plurality of vibration and/or shock isolators, such as isolation pad stacks 26, are set at an angular orientation (e.g. 0 degrees (vertical) to 90 degrees) via the independent angular positioning of each pedestal 28. The angular positioning of the vibration isolators allows control of the independent elements of the system so as to align their stiffness and damping in relation to the center of gravity of the machine. The face 32 of each pad stack 26 is preferably formed so as to be complementary with the shape of its respective corner region 34 of upper base portion 10. While isolation pad stacks 26 have been illustrated, the angular positioning is likewise applicable to air cylinders 24 or any other type of vibration isolator. FIG. 5 shows the same base as in FIGS. 3 and 4 but with the inclusion of two main columns 40, 42 of a gear metrology machine.

Although FIGS. 3-5 show inward angular orientation thereby generally facing the center of gravity of a machine, the invention also contemplates an outward angular orientation. It should be noted that in a non-angled (i.e. zero degrees) vibration isolator mounting (e.g. FIGS. 1 and 2), the vertical direction is pre-loaded by gravity and the lateral direction has no pre-load. With the angled positioning of the vibration isolators, the lateral direction also receives a controlled amount of pre-load due to gravity.

Lengthening the downwardly projecting portion 14, as discussed above, has the effect of changing the location of the center of gravity of the machine. Thus, the center of gravity may be controlled by adding mass to the downwardly projecting portion 14 so as to selectively position the center of gravity, thereby optimizing the effectiveness of the angled isolator elements in controlling all directions of motion and vibration isolation. Even without angled isolators, the center of gravity may be controlled by adding mass to the downwardly projecting portion 14 so as to selectively position the center of gravity.

The shock and vibration isolation system of the invention greatly reduces or eliminates floor vibration into machinery, machinery vibrations affecting the floor, and/or certain machine vibrations effecting the workpiece and/or process. This inventive system allows for control in all directions, vertical, lateral and rocking motions. Cross-compliances can be controlled as the particular application requires. For example, lateral ground motions and machine rocking motions can be specifically tuned.

The inventive isolation system is preferably a passive system (i.e. no control loop is present). However, the invention also contemplates a control loop being included (i.e. active system) such as with the air cylinders and/or with the angled isolators. Additionally, the invention may be incorporated with other various isolation elements such as an active control system device, negative stiffness mechanism device, or other passive device isolators.

As discussed above, the preferred upper base portion 10 preferably has a cross-sectional shape in the general form of the letter "T" and comprises a horizontally extending portion 12 and a downwardly projecting portion 14. However, the invention is not limited thereto. Alternatively, the downwardly projection portion 14 may be in the general shape of the Greek letter Pi "π" or comprise a plurality of individual elements such as cast iron bars or plates or elements of other shapes. The downwardly projection portion 14 may also comprise a block of material, such as cast iron or granite suspended via steel rods from the horizontally extending portion 12. The downwardly projection portion 14 may also be in the form of an external skirt-type element extending from the horizontally extending portion 12. Also, either or both of the lower base portion 8 and upper base portion 10 may be a mechanically tunable tuned mass damper (TMD) or systems of tuned mass dampers.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A gear inspection and measurement machine having two main columns as an operational portion and a machine base with said machine base being configured to reduce or eliminate floor vibration into said operational portion of the machine, said machine base comprising:
    an upper base portion and a lower base portion, there being no direct contact between said upper base portion and said lower base portion;
    said lower base portion including a top end and a bottom end,
    said upper base portion comprising a projecting portion extending downward in a direction toward said lower base portion and further comprising a horizontally extending portion supporting the main columns and located above and attached to said projecting portion;
    a vibration and/or shock isolating system;
    said vibration and/or shock isolating system including an upper vibration and/or shock isolating sub-system located between said upper base portion and said lower base portion.

2. The machine of claim 1 wherein said vibration and/or shock isolating system further includes a lower vibration and/or shock isolating sub-system located below said bottom end of said lower base portion.

3. The machine of claim 1 wherein said upper vibration and/or shock isolating sub-system comprises a plurality of air cylinders.

4. The machine of claim 3 wherein levelling of said air cylinders is individually controlled.

5. The machine of claim 3 wherein the number of said air cylinders is three or more.

6. The machine of claim 3 wherein each of said plurality of air cylinders is located on a pedestal.

7. The machine of claim 2 said lower vibration and/or shock isolating sub-system comprises a plurality of levelling pads.

8. The machine of claim 7 wherein the number of said levelling pads is three or more.

9. The machine of claim 7 wherein said levelling pads comprise steel.

10. The machine of claim 9 wherein said levelling pads further include at least one layer of a polymer composite material.

11. The machine of claim 1 wherein said projecting portion extends downward to at least said top end of said lower base portion.

12. The machine of claim 11 wherein said lower base portion includes a recessed portion opening to said top end and wherein said projecting portion extends into said recessed portion.

13. The machine of claim 11 wherein said lower base portion includes an opening extending between the top and bottom ends and wherein said projecting portion extends into said opening.

14. The machine of clam 13 wherein said projecting portion extends through said opening to said bottom end or below said bottom end.

15. The machine of claim 1 wherein said upper base portion further comprises a horizontally extending portion located above and attached to said projecting portion.

16. The machine of claim 1 wherein said upper vibration and/or shock isolating sub-system comprises a plurality of isolation pad stacks.

17. The machine of claim 1 wherein said upper vibration and/or shock isolating sub-system comprises a plurality of vibration and/or shock isolators with one or more of said plurality of vibration and/or shock isolators being independently and angularly positionable at an angle with respect to the vertical direction.

18. The machine of claim 17 wherein each of said plurality of vibration and/or shock isolators is located on a pedestal whereby the independent and angular positioning of said each of said plurality of vibration and/or shock isolators if effected by independently and angularly positioning each pedestal.

19. The machine of claim 1 wherein said vibration and/or shock isolating system is a passive system.

20. The machine of claim 1 wherein said vibration and/or shock isolating system includes a control loop.

21. The machine of claim 1 wherein said projecting portion comprises a plurality of individual elements extending downward in a direction toward said lower base portion.

22. The machine of claim 1 wherein said projecting portion in the form of an external skirt-type element.

23. The machine of claim 2 wherein one or both of said upper base portion and said lower base portion is a mechanically tunable tuned mass damper.

* * * * *